(12) United States Patent
Zhou et al.

(10) Patent No.: US 10,505,636 B2
(45) Date of Patent: Dec. 10, 2019

(54) METHODS AND APPARATUSES FOR SENDING AND RECEIVING SIGNAL, AND SYSTEM

(71) Applicant: Huawei Technologies Co., Ltd., Shenzhen, Guangdong (CN)

(72) Inventors: Lei Zhou, Shenzhen (CN); Guikai Peng, Shenzhen (CN); Zhenping Wang, Shenzhen (CN); Yongjian Zhan, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/004,627

(22) Filed: Jan. 22, 2016

(65) Prior Publication Data
US 2016/0142143 A1 May 19, 2016

Related U.S. Application Data

(63) Continuation of application No. PCT/CN2013/080026, filed on Jul. 24, 2013.

(51) Int. Cl.
*H04B 10/27* (2013.01)
*H04B 10/272* (2013.01)
(Continued)

(52) U.S. Cl.
CPC .......... *H04B 10/27* (2013.01); *H04B 10/2575* (2013.01); *H04B 10/272* (2013.01); *H04B 10/548* (2013.01); *H04J 13/00* (2013.01)

(58) Field of Classification Search
CPC ....................................................... H04J 13/00
(Continued)

(56) References Cited

U.S. PATENT DOCUMENTS 5,809,069 A * 9/1998 Polley ..................... H04L 27/38
375/222
9,008,512 B2 * 4/2015 Nazarathy ............ H04B 10/272
398/65
(Continued)

FOREIGN PATENT DOCUMENTS

CN 1233368 A 10/1999
CN 101043269 A 9/2007
(Continued)

OTHER PUBLICATIONS

Wei et al; Study of 100 Gigabit Ethernet Using Carrierless Amplitude/phase modulation and optical OFDM, May 1, 2013, Journal of lightwave technology, vol. 31, No. 9, pp. 1367-1373.*
(Continued)

*Primary Examiner* — Amritbir K Sandhu
(74) *Attorney, Agent, or Firm* — Womble Bond Dickinson (US) LLP

(57) ABSTRACT

The present invention relates to the field of mobile communications technologies. The methods for sending and receiving a signal are specifically: splitting a received digital signal into a first digital signal and a second digital signal, respectively converting the first digital signal and the second digital signal into an analog in-phase signal and an analog quadrature signal, respectively modulating the analog in-phase signal and the analog quadrature signal to two optical signals that are perpendicular to each other and are in a polarization state, combining, into one optical signal, the two optical signals that are perpendicular to each other and are in a polarization state, and sending the optical signal to an ONU; and performing, by the ONU, corresponding demodulation on the optical signal, and sending the optical signal to a user terminal.

12 Claims, 14 Drawing Sheets

(51) Int. Cl.
*H04B 10/2575* (2013.01)
*H04J 13/00* (2011.01)
*H04B 10/548* (2013.01)

(58) Field of Classification Search
USPC .................................................. 398/43, 58
See application file for complete search history.

(56) References Cited

U.S. PATENT DOCUMENTS

| | | | |
|---|---|---|---|
| 2007/0230617 A1 | 10/2007 | Tao et al. | |
| 2007/0286238 A1 | 12/2007 | Wang et al. | |
| 2009/0067833 A1* | 3/2009 | Bunge | H04B 10/505 398/43 |
| 2009/0097852 A1* | 4/2009 | Qian | H04J 14/0282 398/89 |
| 2009/0202243 A1* | 8/2009 | Qian | H04B 10/61 398/65 |
| 2009/0296666 A1 | 12/2009 | Rimini | |
| 2010/0027994 A1* | 2/2010 | Xu | H04B 10/548 398/43 |
| 2010/0086303 A1* | 4/2010 | Qian | H04J 14/06 398/65 |
| 2010/0104284 A1* | 4/2010 | Liu | H04B 10/255 398/65 |
| 2010/0166423 A1* | 7/2010 | Chang | H04J 14/06 398/65 |
| 2010/0232461 A1* | 9/2010 | Blauvelt | H04B 10/504 372/26 |
| 2010/0329683 A1* | 12/2010 | Liu | H04B 10/2513 398/81 |
| 2011/0310951 A1 | 12/2011 | Cvijetic et al. | |
| 2012/0106952 A1* | 5/2012 | Xu | H04Q 11/0067 398/28 |
| 2012/0134676 A1* | 5/2012 | Kikuchi | H04B 10/532 398/65 |
| 2012/0213521 A1* | 8/2012 | Zhang | H04B 10/5561 398/79 |
| 2012/0257895 A1* | 10/2012 | Djordjevic | H04B 10/548 398/65 |
| 2013/0071119 A1 | 3/2013 | Liu et al. | |
| 2013/0272721 A1* | 10/2013 | van Veen | H04B 10/60 398/202 |
| 2014/0029957 A1* | 1/2014 | Sethumadhavan | H04B 10/588 398/192 |
| 2014/0126916 A1* | 5/2014 | Ota | H04B 10/2569 398/152 |
| 2014/0186039 A1* | 7/2014 | Luo | H04L 12/2861 398/66 |
| 2014/0193152 A1* | 7/2014 | Zhou | H04B 10/614 398/72 |
| 2014/0199074 A1* | 7/2014 | Cho | H04B 10/548 398/79 |
| 2014/0328592 A1* | 11/2014 | Zhou | H04B 10/61 398/65 |
| 2014/0348507 A1* | 11/2014 | Zhou | H04B 10/2587 398/65 |
| 2015/0092759 A1* | 4/2015 | Cvijetic | H04W 56/001 370/336 |
| 2016/0142143 A1* | 5/2016 | Zhou | H04B 10/272 398/58 |

FOREIGN PATENT DOCUMENTS

| | | |
|---|---|---|
| CN | 101558611 A | 10/2009 |
| CN | 101640820 A | 2/2010 |
| CN | 101807955 A | 8/2010 |
| EP | 0931404 B1 | 1/2003 |
| WO | WO 2012/103832 A3 | 8/2012 |
| WO | WO 2012/149743 A1 | 11/2012 |

OTHER PUBLICATIONS

Othman et al; Using CAP Dimensionallity for Service and User Allocation for Optical Access Networks, 2012, ACP Technical Digest C.*

Wei et al; Study of 100 Gigabit ethernet using carrierless amplitude/phase modulation and optical OFDM; May 1, 2013, Journal of lightwave technology; pp. 1367-1373.*

Othman et al; Using CAP dimensionality for service and user Allocation for optical Access Networks; 2012, Optical society of America OSA.*

Wei et al ; Study of 100 Gigabit Ethernet using carrierless amplitude/phase modulation and optical OFDM , May 2013; Journal of ligthwave technology; pp. 1367-1373 (Year: 2013).*

Jeong-Min Joo et al., "20-Gb/s AMO OFDM Transmission Over 20-km Bidirectional Link by Separate I/Q Baseband Delivery Using Remotely Fed 1-GHz RSOAs", OSA Publishing, Journal of Lightwave Technology, vol. 30, Issue 16, 2012, 3 pages.

Dayou Qian et al., "64/32/16QAM-OFDM using Direct-Detection for 40G-OFDMA-PON Downstream",Optical Society of America, 2011, 3 pages.

Dar-Zu Hsu et al., "A 40-Gbps OFDM LR-PON System over 100-km Fiber Employing an Economical 10-GHz-based Transceiver", Optical Society of America, Jan. 23, 2012, 3 pages.

Tian Dong et al., "Bidirectional Hybrid OFDM-WDM-PON System for 40-Gb/s Downlink and 10-Gb/s Uplink Transmission Using RSOA Remodulation", IEEE Photonics Technology Letters, vol. 24, No. 22, Nov. 15, 2012, p. 2024-2026.

Rodes et al., "Carrierless amplitude phase modulation of VCSEL with 4 bit/s/Hz spectral efficiency for use in WDM-PON", Optics Express, vol. 19, No. 27, Dec. 19, 2011, pp. 26551-26556.

Tao et al., "Experimental demonstration of 10 Gb/s multi-level carrier-less amplitude and phase modulation for short range optical communication systems", Optics Express, vol. 21, No. 5, Mar. 11, 2013, pp. 6459-6465.

* cited by examiner

METHODS AND APPARATUSES FOR SENDING AND RECEIVING SIGNAL, AND SYSTEM

CROSS-REFERENCE TO RELATED APPLICATIONS

This application is a continuation of International Application No. PCT/CN2013/080026, filed on Jul. 24, 2013, which is hereby incorporated by reference in its entirety.

TECHNICAL FIELD

The present invention relates to the field of communications technologies, and in particular, to methods and apparatuses for sending and receiving a signal, and a system.

BACKGROUND

With the development of communications technologies, because a PON (Passive Optical Network) system has advantages of wide bandwidth, good scalability, saving feeder fibers, omitting maintenance and power consumption of active components, and wide coverage, the PON system is increasingly widely applied in the broadband access field.

In order to split signals, which are in coming and going directions and over a same optical fiber, of multiple users, the PON system uses the following two multiplexing technologies to transmit a digital signal, which are specifically as follows:

in a downlink transmission direction (that is, from an optical line terminal to an optical network unit): the OLT (optical line terminal) sends a digital signal in a continuous broadcasting manner, and can send a digital signal to the ONU (Optical Network Unit, optical network unit)/an ONT (Optical Network Terminal, optical network terminal) at any time, all ONUs can receive same digital signals, but each ONU receives its own digital signal by means of filtering; and in an uplink transmission direction (that is, from an optical network unit to an optical line terminal): an optical fiber is occupied separately in different time periods according to certain time length; in each time period, only one ONU can occupy the optical fiber to send a digital signal to the OLT, and the other ONUs turn off lasers, that is, the OLT can receive a digital signal sent by only one ONU at a same time period; if two ONUs simultaneously send digital signals to the OLT, the OLT cannot correctly receive the digital signals, and a conflict occurs between uplink digital signals sent by different ONUS.

With the development of communications technologies, a high transmission rate is of great importance, and system upgrade increases a transmission rate; however, an increase in the transmission rate indicates occupation of higher bandwidth, and in a case of higher bandwidth, optoelectronic components have relatively high costs. Currently, in order to reduce high implementation costs that are brought by high bandwidth after the transmission rate is increased, bandwidth generally needs to be compressed.

In an existing high rate upgrade solution, an up-conversion processing technology needs to be used in a process of performing bandwidth compression on an optical fiber channel in a PON system, and specific processing is: an OLT converts a received digital signal into a digital in-phase signal and a digital quadrature signal, processes the digital in-phase signal and the digital quadrature signal into one digital signal by using an I/Q modulator, loads the digital signal obtained after processing to an optical signal, and then, performs up-conversion processing on the optical signal, and sends the optical signal to an ONU.

However, after a digital signal is processed by using the up-conversion technology, a rate of the digital signal is very high, leading to relatively severe distortion of the digital signal, and relatively poor quality of the digital signal transmitted to an ONU side; in addition, an up-conversion processing device has relatively high costs. Therefore, during signal transmission, the prior art has a problem of relatively poor digital signal quality and relatively high implementation costs.

SUMMARY

Embodiments of the present invention provide methods and apparatuses for sending and receiving a signal, and a system, which are used to resolve a problem in the prior art that during signal transmission in a PON, digital signal quality is relatively poor and implementation costs are relatively high.

According to a first aspect, a method for sending a signal is provided, including:

splitting a received digital signal into a first digital signal and a second digital signal;

respectively converting the first digital signal and the second digital signal into an analog in-phase signal and an analog quadrature signal;

respectively modulating the analog in-phase signal and the analog quadrature signal to two optical signals that are perpendicular to each other and are in a polarization state; and after the two optical signals that are obtained through modulation, are perpendicular to each other, and are in a polarization state are combined into one optical signal, sending the optical signal to an optical network unit ONU.

With reference to the first aspect, in a first possible implementation manner, the respectively converting the first digital signal and the second digital signal into an analog in-phase signal and an analog quadrature signal specifically includes:

respectively converting the first digital signal and the second digital signal into a digital in-phase signal and a digital quadrature signal by using a code division multiplexing CDM modulation scheme or a carrierless amplitude and phase CAP modulation scheme, and respectively converting the digital in-phase signal and the digital quadrature signal into the analog in-phase signal and the analog quadrature signal by using a digital to analog converter; or respectively converting the first digital signal and the second digital signal into a first analog signal and a second analog signal by using a digital to analog converter, and respectively converting the first analog signal and the second analog signal into the analog in-phase signal and the analog quadrature signal by using a code division multiplexing CDM modulation scheme or a carrierless amplitude and phase CAP modulation scheme.

With reference to the first possible implementation manner of the first aspect, in a second possible implementation manner, the respectively converting the first digital signal and the second digital signal into a digital in-phase signal and a digital quadrature signal by using a CAP modulation scheme specifically includes:

separately processing the first digital signal and the second digital signal by using filters whose impulse responses are orthogonal, to respectively convert the first digital signal and the second digital signal into the digital in-phase signal and the digital quadrature signal; and the respectively converting the first analog signal and the second analog signal into the analog in-phase signal and the analog quadrature signal by using a CAP modulation scheme specifically includes:

separately processing the first analog signal and the second analog signal by using filters whose impulse responses are orthogonal, to respectively convert the first analog signal and the second analog signal into the analog in-phase signal and the analog quadrature signal.

According to a second aspect, a method for receiving a signal is provided, including:

receiving an optical signal sent by an optical line terminal OLT;

converting the received optical signal into an electrical signal, and splitting the electrical signal into an analog in-phase signal and an analog quadrature signal;

respectively converting the analog in-phase signal and the analog quadrature signal into a first digital signal and a second digital signal; and after the first digital signal and the second digital signal are combined into one digital signal, sending the digital signal to a user terminal.

With reference to the second aspect, in a first possible implementation manner, the respectively converting the analog in-phase signal and the analog quadrature signal into a first digital signal and a second digital signal specifically includes:

respectively converting the analog in-phase signal and the analog quadrature signal into a first analog signal and a second analog signal by using a code division multiplexing CDM demodulation scheme or a carrierless amplitude and phase CAP demodulation scheme, and respectively converting the first analog signal and the second analog signal into the first digital signal and the second digital signal by using an analog to digital converter; or respectively converting the analog in-phase signal and the analog quadrature signal into a digital in-phase signal and a digital quadrature signal by using an analog to digital converter, and respectively converting the digital in-phase signal and the digital quadrature signal into the first digital signal and the second digital signal by using a code division multiplexing CDM demodulation scheme or a carrierless amplitude and phase CAP demodulation scheme.

With reference to the first possible implementation manner of the second aspect, in a second possible implementation manner, the respectively converting the analog in-phase signal and the analog quadrature signal into a first analog signal and a second analog signal by using a CAP demodulation scheme specifically includes:

separately processing the analog in-phase signal and the analog quadrature signal by using filters whose impulse responses are orthogonal, to convert the analog in-phase signal and the analog quadrature signal into the first analog signal and the second analog signal; or the respectively converting the digital in-phase signal and the digital quadrature signal into the first digital signal and the second digital signal by using a CAP demodulation scheme specifically includes:

separately processing the digital in-phase signal and the digital quadrature signal by using filters whose impulse responses are orthogonal, to convert the digital in-phase signal and the digital quadrature signal into the first digital signal and the second digital signal.

According to a third aspect, an apparatus for sending a signal is provided, including:

a receiver, configured to split a received digital signal into a first digital signal and a second digital signal;

a digital to analog orthogonal converter, configured to respectively convert the first digital signal and the second digital signal into an analog in-phase signal and an analog quadrature signal;

an optical modulator, configured to respectively modulate the analog in-phase signal and the analog quadrature signal to two optical signals that are perpendicular to each other and are in a polarization state; and a polarization beam combiner, configured to: after combining the two optical signals that are obtained through modulation, are perpendicular to each other, and are in a polarization state into one optical signal, send the optical signal to an optical network unit ONU.

With reference to the third aspect, in a first possible implementation manner, the digital to analog orthogonal converter is specifically configured to respectively convert the first digital signal and the second digital signal into a digital in-phase signal and a digital quadrature signal by using a code division multiplexing CDM modulation scheme or a carrierless amplitude and phase CAP modulation scheme, and respectively convert the digital in-phase signal and the digital quadrature signal into the analog in-phase signal and the analog quadrature signal; or respectively convert the first digital signal and the second digital signal into a first analog signal and a second analog signal, and respectively convert the first analog signal and the second analog signal into the analog in-phase signal and the analog quadrature signal by using a code division multiplexing CDM modulation scheme or a carrierless amplitude and phase CAP modulation scheme.

With reference to the first possible implementation manner of the third aspect, in a second possible implementation manner, the digital to analog orthogonal converter is specifically configured to separately process the first digital signal and the second digital signal by using filters whose impulse responses are orthogonal, to respectively convert the first digital signal and the second digital signal into the digital in-phase signal and the digital quadrature signal; or, separately process the first analog signal and the second analog signal by using filters whose impulse responses are orthogonal, to respectively convert the first analog signal and the second analog signal into the analog in-phase signal and the analog quadrature signal.

According to a fourth aspect, an apparatus for receiving a signal is provided, including:

a photonic detector, configured to receive an optical signal sent by an optical line terminal OLT, convert the received optical signal into an electrical signal, and split the electrical signal into an analog in-phase signal and an analog quadrature signal;

an analog to digital non-orthogonal converter, configured to respectively convert the analog in-phase signal and the analog quadrature signal into a first digital signal and a second digital signal; and a transmitter, configured to: after combining the first digital signal and the second digital signal into one digital signal, send the digital signal to a user terminal.

With reference to the fourth aspect, in a first possible implementation manner, the analog to digital non-orthogonal converter is specifically configured to respectively convert the analog in-phase signal and the analog quadrature signal into a first analog signal and a second analog signal by using a code division multiplexing CDM demodulation scheme or a carrierless amplitude and phase CAP demodulation scheme, and respectively convert the first analog signal and the second analog signal into the first digital signal and the second digital signal by using an analog to digital converter; or, respectively convert the analog in-phase signal and the analog quadrature signal into a digital in-phase signal and a digital quadrature signal by using an analog to digital converter, and convert the digital in-phase signal and the digital quadrature signal into the first digital signal and the second digital signal by using a code division multiplexing CDM demodulation scheme or a carrierless amplitude and phase CAP demodulation scheme.

With reference to the first possible implementation manner of the fourth aspect, in a second possible implementation manner, the analog to digital non-orthogonal converter is specifically configured to separately process the analog in-phase signal and the analog quadrature signal by using filters whose impulse responses are orthogonal, to convert the analog in-phase signal and the analog quadrature signal into the first analog signal and the second analog signal; or, separately process the digital in-phase signal and the digital quadrature signal by using filters whose impulse responses are orthogonal, to convert the digital in-phase signal and the digital quadrature signal into the first digital signal and the second digital signal.

According to a fifth aspect, a passive optical network PON system is provided, including: an optical line terminal OLT, an optical network unit ONU, and a passive optical splitter configured to connect the OLT and the ONU, where the OLT includes the apparatus according to any one of the third aspect and the possible implementation manners of the third aspect, and the ONU includes the apparatus according to any one of the fourth aspect and the possible implementation manners of the fourth aspect.

A specific technical solution provided by the embodiments of the present invention is as follows:

In the present invention, a method for sending a signal is put forward. A received digital signal is split into a first digital signal and a second digital signal, the first digital signal and the second digital signal are respectively converted into an analog in-phase signal and an analog quadrature signal, after the analog in-phase signal and the analog quadrature signal are respectively modulated to two optical signals that are perpendicular to each other and are in a polarization state, the two optical signals that are perpendicular to each other and are in a polarization state are combined into one optical signal, and the optical signal is sent to an ONU. A method for receiving a signal is put forward. An optical signal sent by an optical line terminal OLT is received, the received optical signal is then converted into an electrical signal, the electrical signal is split into an analog in-phase signal and an analog quadrature signal, the analog in-phase signal and the analog quadrature signal are respectively converted into a first digital signal and a second digital signal, and finally, after the first digital signal and the second digital signal are combined into one digital signal, the digital signal is sent to a user terminal. In this way, in a signal transmission process, there is no need to use an up-conversion processing technology, and an optical signal received by an ONU does not distort. Therefore, quality of a signal transmitted to the ONU is improved. In addition, there is no need to use an up-conversion processing device, which further reduces implementation costs.

DETAILED DESCRIPTION

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In addition, the teems "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In order to resolve a problem in the prior art that during signal transmission, digital signal quality is relatively poor and implementation costs are relatively high, in the embodiments of the present invention, when a digital signal is sent, the digital signal is split into a first digital signal and a second digital signal, the first digital signal and the second digital signal are respectively converted into an analog in-phase signal and an analog quadrature signal, the analog in-phase signal and the analog quadrature signal are respectively modulated to two optical signals that are perpendicular to each other and are in a polarization state, the two optical signals that are perpendicular to each other and are in a polarization state are combined into one optical signal, and the optical signal is sent to an ONU; after a optical signal sent by an OLT is received, the received optical signal is converted into an electrical signal, the electrical signal is split into an analog in-phase signal and an analog quadrature signal, the analog in-phase signal and the analog quadrature signal are respectively converted into a first digital signal and a second digital signal, and after the first digital signal and the second digital signal are combined into one digital signal, the digital signal is sent to a user terminal. In this way, there is no need to use an up-conversion technology, which therefore improves quality of a digital signal transmitted to an ONU, and further reduces implementation costs.

Optional implementation manners of the present invention are described below in detail with reference to accompanying drawings.

Figure 1:
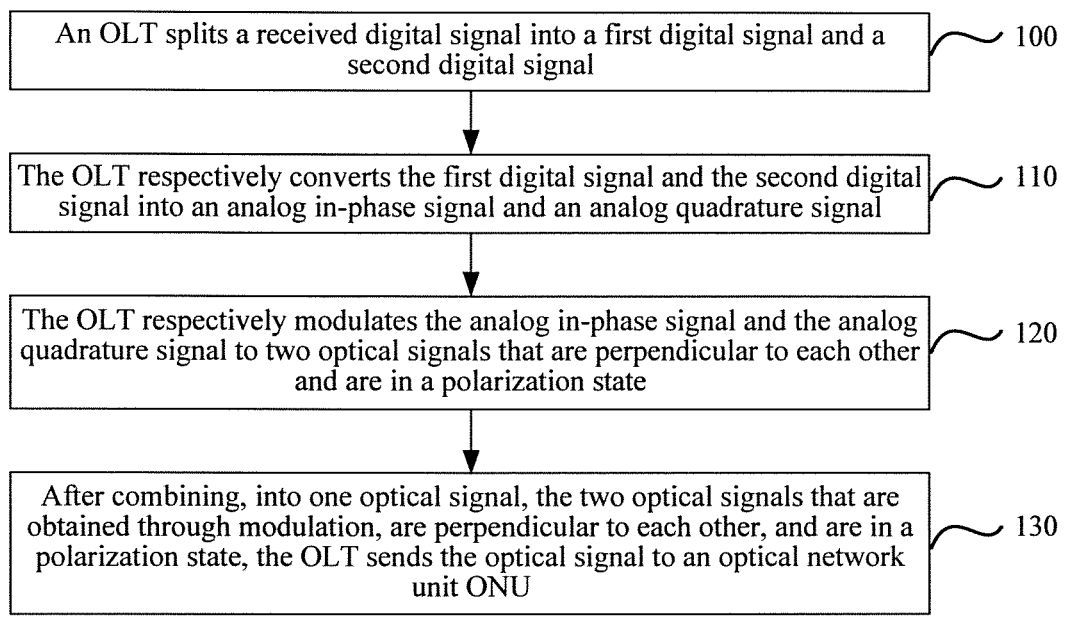
FIG. 1 is a flowchart of controlling signal sending according to an embodiment of the present invention.

As shown in FIG. 1, in an embodiment of the present invention, a specific procedure of signal sending is as follows, there are multiple types of entities for executing signal sending, and descriptions are made below by using an example in which an entity for executing signal sending is an OLT.

Step 100: An OLT splits a received digital signal into a first digital signal and a second digital signal.

Step 110: The OLT respectively converts the first digital signal and the second digital signal into an analog in-phase signal and an analog quadrature signal.

Step 120: The OLT respectively modulates the analog in-phase signal and the analog quadrature signal to two optical signals that are perpendicular to each other and are in a polarization state.

Step 130: After combining, into one optical signal, the two optical signals that are obtained through modulation, are perpendicular to each other, and are in a polarization state, the OLT sends the optical signal to an ONU.

In this embodiment of the present invention, there are multiple types of sources of a digital signal received by the OLT, for example, the OLT receives a digital signal sent by a core network.

In this embodiment of the present invention, there are multiple manners for the OLT to split a received digital signal into a first digital signal and a second digital signal. Optionally, the OLT may split the received digital signal into the first digital signal and the second digital signal by using a QAM (Quadrature Amplitude Modulation) scheme, or may split the received digital signal into the first digital signal and the second digital signal by using a PAM (Pulse Amplitude Modulation, pulse amplitude modulation) scheme.

When the OLT splits the received digital signal into the first digital signal and the second digital signal by using the QAM scheme, the digital signal is split into multiple low-rate parallel digital signals first by using a serial/parallel conversion module, and m-order QAM modulation is performed on each low-rate digital signal to reduce a rate again, where m-order QAM modulation is converting log 2 (m) bits into one symbol for transmission, which is equivalent to reducing a rate by log 2 (m) times. Then, inverse fast Fourier transformation (IFFT) algorithm processing is performed on each digital signal by using an IFFT module, to convert frequency domain data into a time domain waveform, and finally, the multiple low-rate parallel digital signals are multiplexed into two high-rate digital signals, that is, the first digital signal and the second digital signal are output.

For example, a digital signal that is received by the OLT and sent by a core network has a rate of 40 Gb/s, and the digital signal is split into four low-rate parallel digital signals by using the serial/parallel conversion module, where each digital signal has a rate of 10 Gb/s, 16-order QAM modulation is separately performed on the four parallel digital signals having a rate of 10 Gb/s, and the four parallel digital signals are converted into four parallel digital signals having a rate of 2.5 G/s, which reduces a rate again. Then, inverse fast Fourier transformation algorithm processing is separately performed on the four parallel digital signals having a rate of 2.5 G/s by using the IFFT module, and finally, the four parallel digital signals are multiplexed into two parallel digital signals having a rate of 10 Gb/s by using a parallel/serial module, that is, a first digital signal having a rate of 10 Gb/s and a second digital signal having a rate of 10 Gb/s are output.

For example, a digital signal that is received by the OLT and sent by a core network has a rate of 40 Gb/s, and the digital signal is split into two low-rate parallel digital signals by using a serial/parallel conversion module, where each digital signal has a rate of 20 Gb/s, 16-order PAM modulation is separately performed on the two parallel digital signals having a rate of 20 Gb/s to reduce a rate again, and the two parallel digital signals are converted into two parallel digital signals having a rate of 2.5 G/s, that is, both an output first digital signal and an output second digital signal have a rate of 2.5 G/s.

In this embodiment of the present invention, when the first digital signal and the second digital signal are respectively converted into the analog in-phase signal and the analog quadrature signal, the first digital signal and the second digital signal may be first converted into a first analog signal and a second analog signal, and then the first analog signal and the second analog signal are converted into the analog in-phase signal and the analog quadrature signal; or, the first digital signal and the second digital signal may be first converted into a digital in-phase signal and a digital quadrature signal, and then the digital in-phase signal and the digital quadrature signal are converted into the analog in-phase signal and the analog quadrature signal.

In this embodiment of the present invention, there are multiple manners for converting the first analog signal and the second analog signal into the analog in-phase signal and the analog quadrature signal, or converting the first digital signal and the second digital signal into the digital in-phase signal and the digital quadrature signal. Optionally, by using CDM (Code Division Multiplexing) modulation, the first analog signal and the second analog signal may be converted into the analog in-phase signal and the analog quadrature signal, or the first digital signal and the second digital signal may be converted into the digital in-phase signal and the digital quadrature signal; or by using CAP (Carrierless amplitude and phase, carrierless amplitude and phase) modulation, the first analog signal and the second analog signal may be converted into the analog in-phase signal and the analog quadrature signal, or the first digital signal and the second digital signal may be converted into the digital in-phase signal and the digital quadrature signal. Moreover, there are also multiple manners for converting the first digital signal and the second digital signal into the first analog signal and the second analog signal, or converting the digital in-phase signal and the digital quadrature signal into the analog in-phase signal and the analog quadrature signal.

Optionally, by using a DAC (Digital to Analog Converter, digital to analog converter), the first digital signal and the second digital signal may be respectively converted into the first analog signal and the second analog signal, or the digital in-phase signal and the digital quadrature signal may be converted into the analog in-phase signal and the analog quadrature signal.

There are multiple manners for the OLT to convert the first digital signal and the second digital signal into the digital in-phase signal and the digital quadrature signal by using a CDM modulation scheme. Optionally, the OLT multiplies the first digital signal by a first codeword, and multiples the second digital signal by a second codeword, to obtain the digital in-phase signal and the digital quadrature signal, where the first codeword and the second codeword are codewords that are mutually orthogonal. Orthogonal code refer to two different codewords whose multiply-accumulate result is 0, and a length of an orthogonal code may be arbitrary, for example, 2 bits (byte), 3 bits, or 4 bits.

For example, a group of sequences are (c1, c2, c3, c4), where c1=[1 1 1 1] and c2=[1 −1 1 −1]; because c1×c2=1× 1+1×(−1)+1×1+1×(−1)=0, c1 and c2 are orthogonal codes. The digital in-phase signal and the digital quadrature signal are respectively multiplied by the orthogonal codes c1 and c2 to complete CDM modulation, and modulated signals are I1=I×c1 and Q1=Q×c2.

Similarly, there are multiple manners for the OLT to convert the first analog signal and the second analog signal into the analog in-phase signal and the analog quadrature signal by using a CDM modulation scheme. Optionally, the OLT multiplies the first analog signal by a first codeword, and multiplies the second analog signal by a second codeword, to obtain the digital in-phase signal and the digital quadrature signal, where the first codeword and the second codeword are codewords that are mutually orthogonal.

In this embodiment of the present invention, when the digital in-phase signal and the digital quadrature signal are orthogonalized by using CDM modulation, optionally, the digital in-phase signal and the digital quadrature signal are separately processed by using orthogonal codes for orthogonalization. Orthogonal codes refer to two different codewords whose multiply-accumulate result is 0, and a length of an orthogonal code may be arbitrary, for example, 2 bits (byte), 3 bits, or 4 bits.

There are multiple manners for the OLT to convert the first digital signal and the second digital signal into the digital in-phase signal and the digital quadrature signal by using a CAP modulation scheme. Optionally, the OLT separately processes the first digital signal and the second digital signal by using filters whose impulse responses are orthogonal, to convert the first digital signal and the second digital signal into the digital in-phase signal and the digital quadrature signal.

Similarly, there are multiple manners for the OLT to convert the first analog signal and the second analog signal into the analog in-phase signal and the analog quadrature signal by using a CAP modulation scheme. Optionally, the OLT separately processes the first analog signal and the second analog signal by using filters whose impulse responses are orthogonal, to convert the first analog signal and the second analog signal into the analog in-phase signal and the analog quadrature signal.

In this embodiment of the present invention, when the OLT splits the received digital signal into the first digital signal and the second digital signal by using a QAM modulation scheme, the first digital signal and the second digital signal that are obtained by splitting are subsequently converted into the digital in-phase signal and the digital quadrature signal by using CDM modulation, or the first analog signal and the second analog signal that are obtained by splitting are subsequently converted into the analog in-phase signal and the analog quadrature signal by using CDM modulation; when the OLT splits the received digital signal into the first digital signal and the second digital signal by using a PAM modulation scheme, the first digital signal and the second digital signal that are obtained by splitting are subsequently converted into the digital in-phase signal and the digital quadrature signal by using CAP modulation, or the first analog signal and the second analog signal that are obtained through splitting are subsequently converted into the analog in-phase signal and the analog quadrature signal by using CAP modulation.

In this embodiment of the present invention, when the OLT respectively modulates the analog in-phase signal and the analog quadrature signal to the two optical signals that are perpendicular to each other and are in a polarization state, an optical signal sent by a Laser (laser) is converted into the two optical signals that are perpendicular to each other and are in a polarization state by using a PBS (Polarization Beam Splitter, polarization beam splitter), and the OLT respectively modulates the analog in-phase signal and the analog quadrature signal to the two optical signals that are perpendicular to each other and are in a polarization state, combines, into one optical signal by using a PBC (Polarization Beam Combiner, polarization beam combiner), the two optical signals that are perpendicular to each other and are in a polarization state, and sends the optical signal to the ONU.

In order to better understand this embodiment of the present invention, specific application scenarios are provided below, and a procedure of signal sending is further described in detail.

Figure 2A:
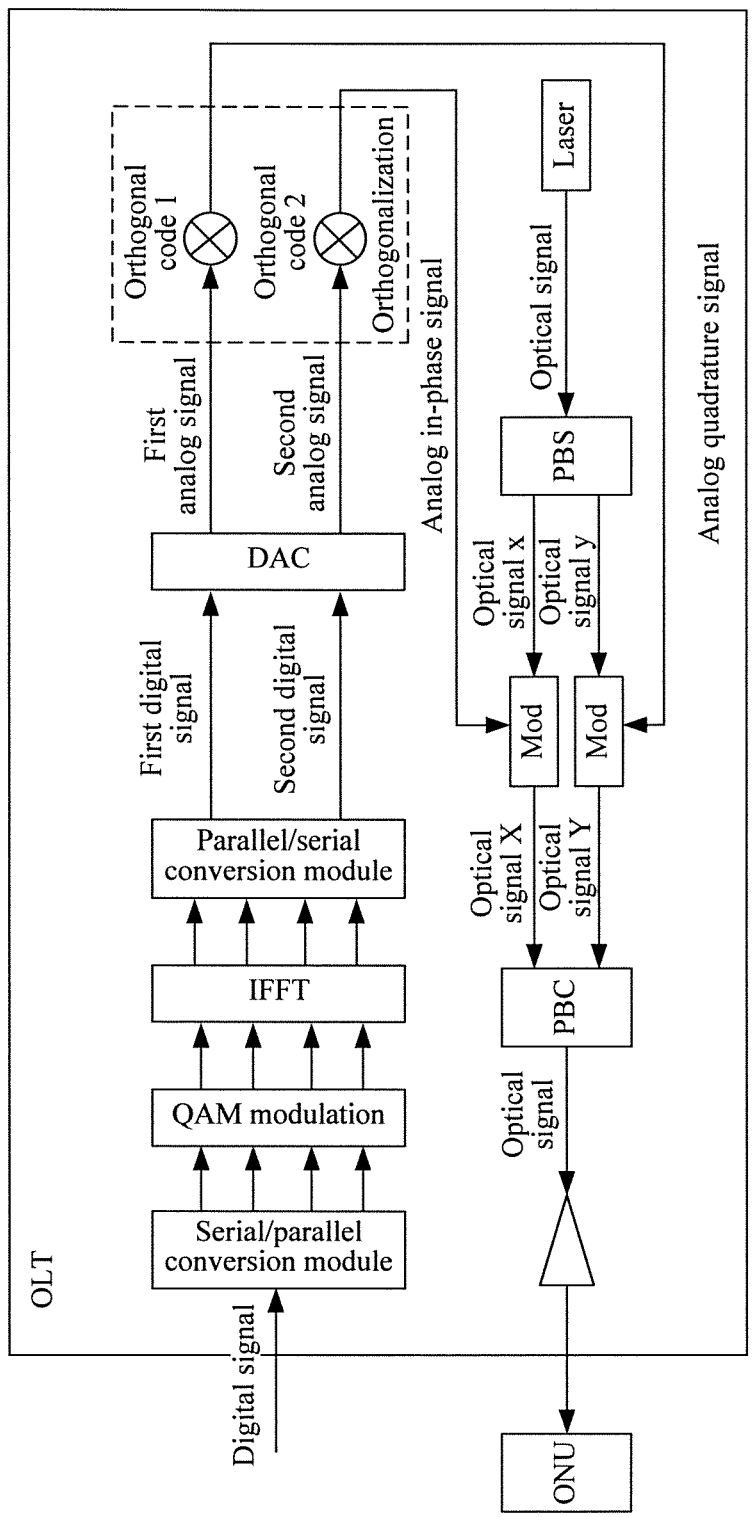
FIG. 2A is a flowchart of an example of a first application scenario of signal sending according to an embodiment of the present invention.

Embodiment 1 (as Specifically Shown in FIG. 2A)

Step 200: An OLT splits a digital signal into four low-rate parallel digital signals by using a serial/parallel conversion module.

Step 210: The OLT performs m-order QAM modulation on each digital signal to reduce a rate again.

Step 220: The OLT performs, by using an IFFT module, inverse fast Fourier transformation algorithm processing on each digital signal whose rate is reduced again.

Step 230: The OLT multiplexes the four digital signals into a first digital signal and a second digital signal.

Step 240: The OLT converts the first digital signal and the second digital signal into a first analog signal and a second analog signal by using a DA.

Step 250: The OLT respectively multiples, by orthogonal codes, the first analog signal and the second analog signal that are obtained through conversion, and converts the first analog signal and the second analog signal into an analog in-phase signal and an analog quadrature signal.

Step 260: The OLT respectively modulates the analog in-phase signal and the analog quadrature signal to an optical signal x and an optical signal y that are perpendicular to each other and are in a polarization state.

Figure 2B:
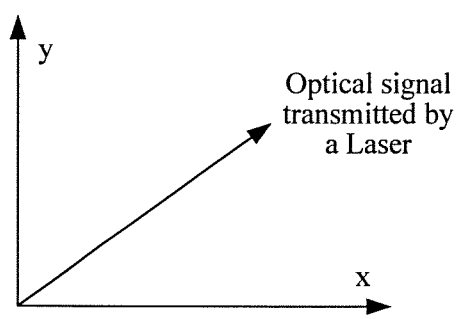
FIG. 2B is a schematic diagram of transmitting light by a Laser according to an embodiment of the present invention.

In this step, a PBS splits, into an optical signal x and an optical signal y that are perpendicular to each other and are in a polarization state, an optical signal sent by a Laser (as shown in FIG. 2B). In order to make optical power of the optical signal x in a polarization state and optical power of the optical signal y in a polarization state identical, a vibration direction of a polarization state of the optical signal sent by the Laser is at an angle of 45 degrees to the major axis of the PBS. Then, the OLT respectively loads, by using an optical modulator (Mod), the analog in-phase signal and the analog quadrature signal to the optical signal x and the optical signal y that are perpendicular to each other and are in a polarization state.

Step 270: After combining, into one optical signal, the optical signal X and the optical signal Y that respectively include the analog in-phase signal and the analog quadrature signal and are in a polarization state, the OLT sends the optical signal to an ONU.

In this step, the optical signal X and the optical signal Y that are perpendicular to each other and are in a polarization state are combined into the one optical signal by using a PBC.

Figure 3:
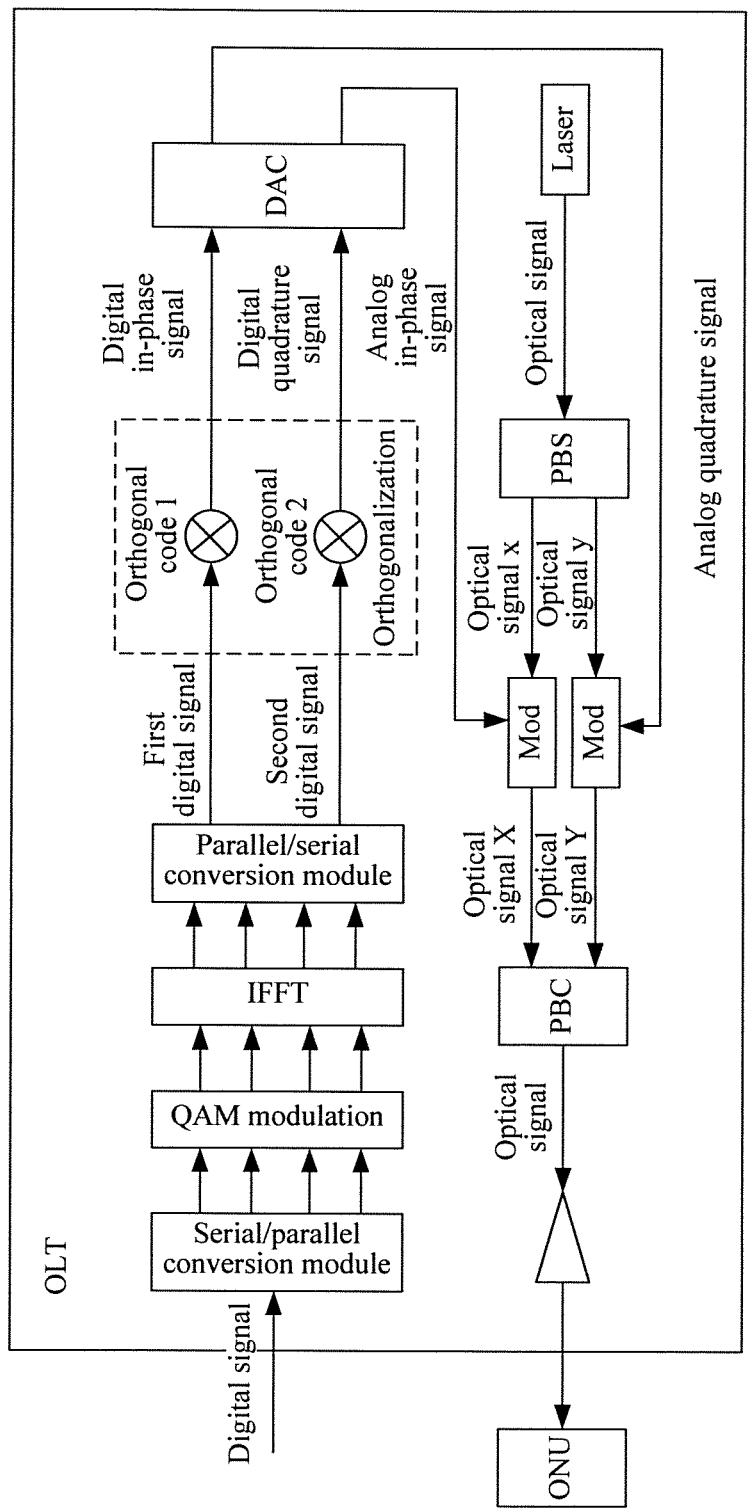
FIG. 3 is a flowchart of an example of a second application scenario of signal sending according to an embodiment of the present invention.

Embodiment 2 (As Specifically Shown in FIG. 3)

Step 300: An OLT splits a digital signal into four low-rate parallel digital signals by using a serial/parallel conversion module.

Step 310: The OLT performs m-order QAM modulation on each digital signal to reduce a rate again.

Step 320: The OLT performs, by using an IFFT module, inverse fast Fourier transformation algorithm processing on each digital signal whose rate is reduced again.

Step 330: The OLT multiplexes the four digital signals into a first digital signal and a second digital signal.

Step 340: The OLT respectively multiples the first digital signal and the second digital signal by orthogonal codes for orthogonalization processing, to obtain a digital in-phase signal and a digital quadrature signal.

Step 350: The OLT converts the digital in-phase signal and the digital quadrature signal into an analog in-phase signal and an analog quadrature signal by using a DAC.

Step 360: Respectively modulate the analog in-phase signal and the analog quadrature signal to an optical signal X and an optical signal Y that are perpendicular to each other and are in a polarization state.

Identical with step 260, in this step, a PBS splits, into an optical signal x and an optical signal y that are perpendicular to each other and are in a polarization state, an optical signal sent by a Laser. In order to make optical power of the optical signal x in a polarization state and optical power of the optical signal y in a polarization state identical, a vibration direction of a polarization state of the optical signal sent by the Laser is at an angle of 45 degrees to the major axis of the PBS. Then, the OLT respectively loads, by using an optical modulator (Mod), the analog in-phase signal and the analog quadrature signal to the optical signal x and the optical signal y that are perpendicular to each other and are in a polarization state.

Step 370: After combining, into one optical signal, the optical signal X and the optical signal Y that respectively include the analog in-phase signal and the analog quadrature signal and are in a polarization state, the OLT sends the optical signal to an ONU.

In this step, the optical signal X and the optical signal Y that are perpendicular to each other and are in a polarization state are combined into the one optical signal by using a PBC.

Figure 4:
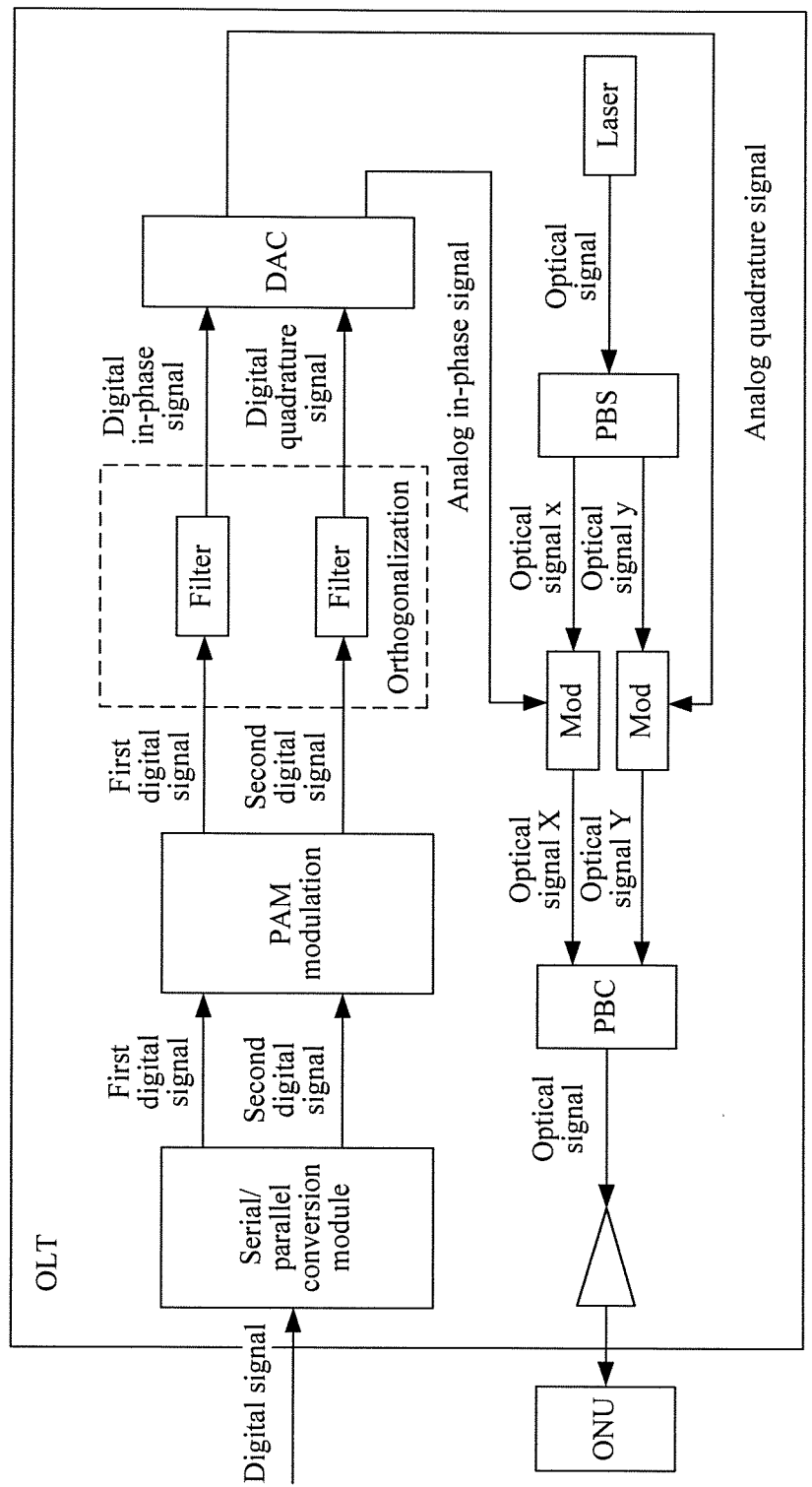
FIG. 4 is a flowchart of an example of a third application scenario of signal sending according to an embodiment of the present invention.

Embodiment 3 (as Specifically Shown in FIG. 4)

Step 400: An OLT splits a digital signal into two low-rate parallel digital signals by using a serial/parallel conversion module.

Step 410: After separately performing m-order PAM modulation processing on the two digital signals, the OLT generates a first digital signal and a second digital signal.

Step 420: The OLT separately performs orthogonalization processing on the first digital signal and the second digital signal by using filters whose impulse responses are orthogonal, to obtain a digital in-phase signal and a digital quadrature signal.

Step 430: The OLT converts the digital in-phase signal and the digital quadrature signal into an analog in-phase signal and an analog quadrature signal by using a DAC.

Step 440: The OLT respectively modulates the analog in-phase signal and the analog quadrature signal to an optical signal X and an optical signal Y that are perpendicular to each other and are in a polarization state.

Identical with step 260, in this step, a PBS splits, into an optical signal x and an optical signal y that are perpendicular to each other and are in a polarization state, an optical signal sent by a Laser. In order to make optical power of the optical signal x in a polarization state and optical power of the optical signal y in a polarization state identical, a vibration direction of a polarization state of the optical signal sent by the Laser is at an angle of 45 degrees to the major axis of the PBS. Then, the OLT respectively loads, by using an optical modulator (Mod), the analog in-phase signal and the analog quadrature signal to the optical signal x and the optical signal y that are perpendicular to each other and are in a polarization state.

Step 450: After combining, into one optical signal, the optical signal X and the optical signal Y that respectively include the analog in-phase signal and the analog quadrature signal and are in a polarization state, the OLT sends the optical signal to an ONU.

In this step, the optical signal X and the optical signal Y that are perpendicular to each other and are in a polarization state are combined into the one optical signal by using a PBC.

Figure 5:
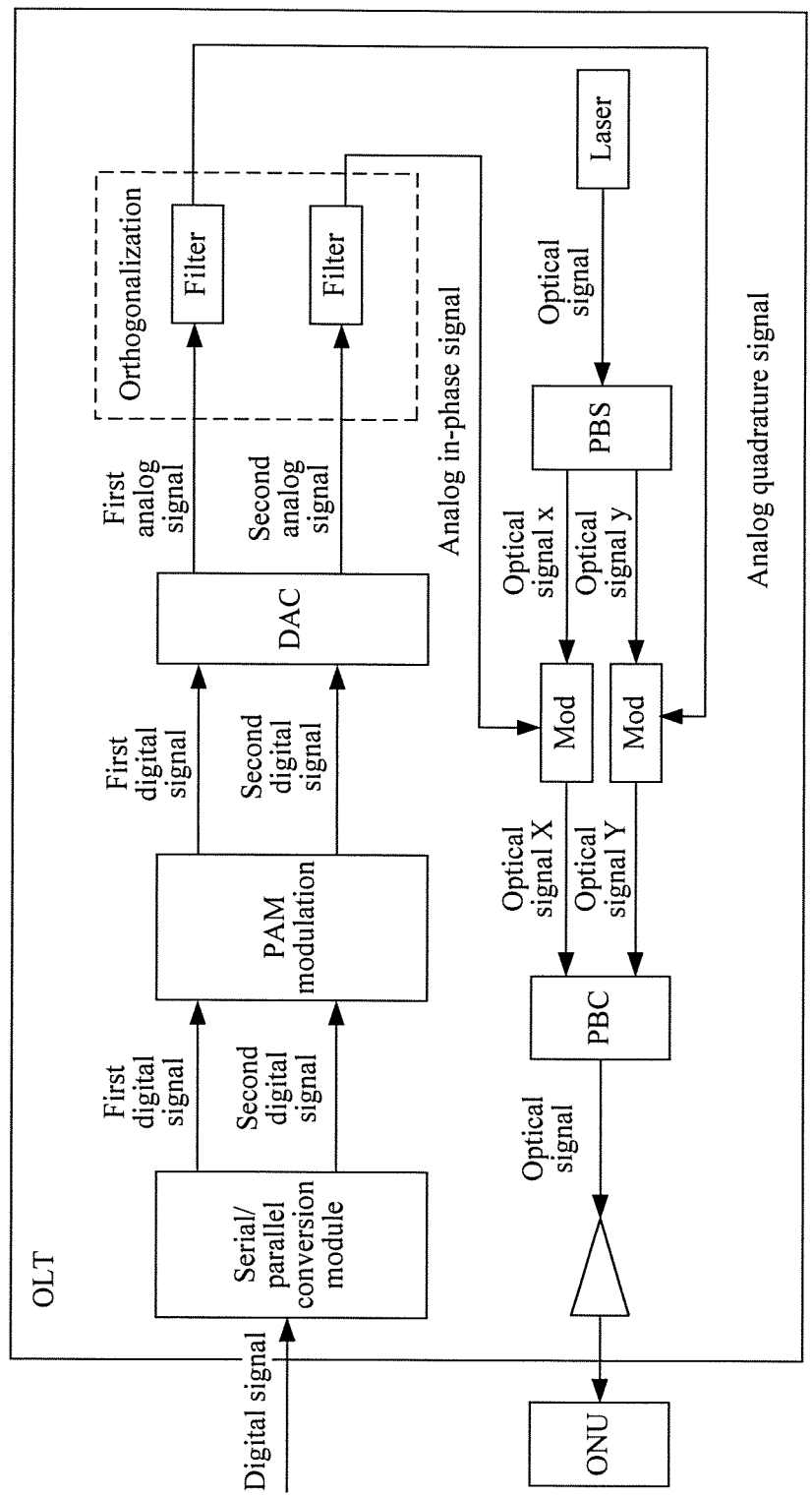
FIG. 5 is a flowchart of an example of a fourth application scenario of signal sending according to an embodiment of the present invention.

Embodiment 4 (As Specifically Shown in FIG. 5)

Step 500: An OLT splits a digital signal into a low-rate parallel first digital signal and second digital signal by using a serial/parallel conversion module.

Step 510: The OLT separately performs m-order PAM modulation on the first digital signal and the second digital signal to reduce a rate.

Step 520: The OLT converts the first digital signal and the second digital signal into a first analog signal and a second analog signal by using a DAC.

Step 530: The OLT performs orthogonalization processing on the first analog signal and the second analog signal by using filters whose impulse responses are orthogonal, to obtain an analog in-phase signal and an analog quadrature signal.

Step 540: The OLT respectively modulates the analog in-phase signal and the analog quadrature signal to an optical signal X and an optical signal Y that are perpendicular to each other and are in a polarization state.

Identical with step 260, in this step, a PBS splits, into an optical signal x and an optical signal y that are perpendicular to each other and are in a polarization state, an optical signal sent by a Laser. In order to make optical power of the optical signal x in a polarization state and optical power of the optical signal y in a polarization state identical, a vibration direction of a polarization state of the optical signal sent by the Laser is at an angle of 45 degrees to the major axis of the PBS. Then, the OLT respectively loads, by using an optical modulator (Mod), the analog in-phase signal and the analog quadrature signal to the optical signal x and the optical signal y that are perpendicular to each other and are in a polarization state.

Step 550: After combining, into one optical signal, the optical signal X and the optical signal Y that respectively include the analog in-phase signal and the analog quadrature signal and are in a polarization state, the OLT sends the optical signal to an ONU.

In this step, the optical signal X and the optical signal Y that are perpendicular to each other and are in a polarization state are combined into the one optical signal by using a PBC.

Figure 6:
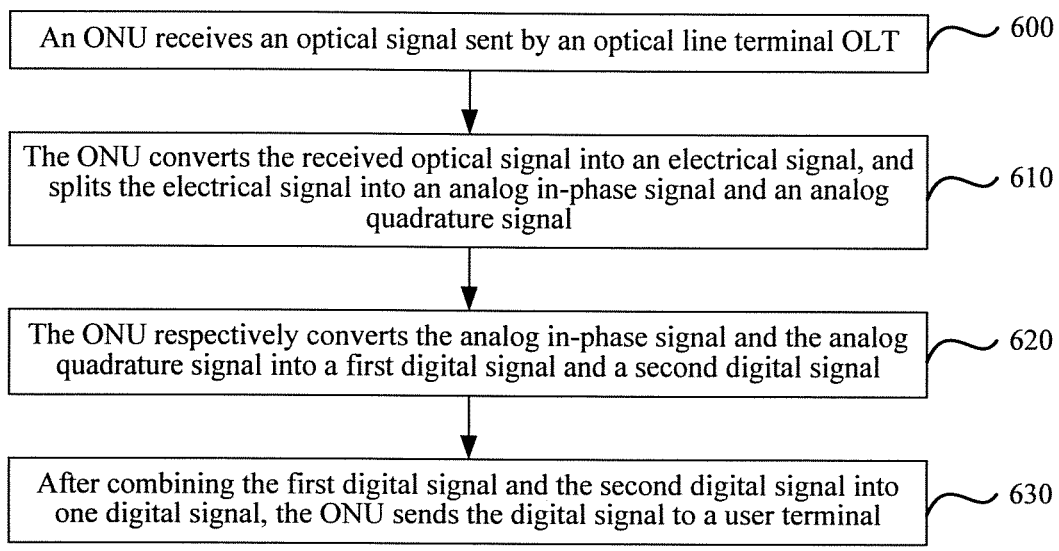
FIG. 6 is a flowchart of controlling signal receiving according to an embodiment of the present invention.

The present invention further puts forward a method for receiving a signal. As shown in FIG. 6, a specific procedure of signal receiving is as follows, there are multiple types of entities for executing signal receiving, and descriptions are made below by using an example in which an entity for executing signal receiving is an ONU.

Step 600: An ONU receives an optical signal sent by an optical line terminal OLT.

Step 610: The ONU converts the received optical signal into an electrical signal, and splits the electrical signal into an analog in-phase signal and an analog quadrature signal.

Step 620: The ONU respectively converts the analog in-phase signal and the analog quadrature signal into a first digital signal and a second digital signal.

Step 630: After combining the first digital signal and the second digital signal into one digital signal, the ONU sends the digital signal to a user terminal.

In this embodiment of the present invention, when the ONU converts the optical signal into the electrical signal, the received optical signal sent by the OLT is first converted into the electrical signal by using a PD (Photonic Detector, photonic detector), and the electrical signal is then split into the analog in-phase signal and the analog quadrature signal.

In this embodiment of the present invention, there are multiple manners for the ONU to respectively convert the analog in-phase signal and the analog quadrature signal into the first digital signal and the second digital signal. For example, non-orthogonalization may be performed on the analog in-phase signal and the analog quadrature signal first, the analog in-phase signal and the analog quadrature signal are converted into a first analog signal and a second analog signal, and the first analog signal and the second analog signal are then converted into the first digital signal and the second digital signal; or, the analog in-phase signal and the analog quadrature signal may be first converted into a digital in-phase signal and a digital quadrature signal, and the digital in-phase signal and the digital quadrature signal are then converted into the first digital signal and the second digital signal.

In this embodiment of the present invention, there are multiple manners for the ONU to perform non-orthogonalization on the analog in-phase signal and the analog quadrature signal, and convert the analog in-phase signal and the analog quadrature signal into the first analog signal and the second analog signal, or convert the digital in-phase signal and the digital quadrature signal into the first digital signal and the second digital signal. Preferably, the ONU performs non-orthogonalization on the analog in-phase signal by using CDM demodulation or by using CPA demodulation to convert the analog in-phase signal and the analog quadrature signal into the first analog signal and the second analog signal, or converts the digital in-phase signal and the digital quadrature signal into the first digital signal and the second digital signal by using CDM demodulation or by using CPA demodulation.

Similarly, there are multiple manners for the ONU to convert the first analog signal and the second analog signal into the first digital signal and the second digital signal, or convert the analog in-phase signal and the analog quadrature signal into the digital in-phase signal and the digital quadrature signal. Optionally, by using an ADC (Analog to Digital Converter, analog to digital converter), the first analog signal and the second analog signal are respectively converted into the first digital signal and the second digital signal or the analog in-phase signal and the analog quadrature signal are converted into the digital in-phase signal and the digital quadrature signal.

When the ONU performs non-orthogonalization on the analog in-phase signal and the analog quadrature signal by using CDM demodulation, to convert the analog in-phase signal and the analog quadrature signal into the first analog signal and the second analog signal, or converts the digital in-phase signal and the digital quadrature signal into the first digital signal and the second digital signal by using CDM demodulation, optionally, the analog in-phase signal and the analog quadrature signal may be separately processed by using corresponding orthogonal codes for non-orthogonalization, and the analog in-phase signal and the analog quadrature signal are converted into the first analog signal and the second analog signal, or the digital in-phase signal and the digital quadrature signal are processed by using corresponding orthogonal codes, and the digital in-phase signal and the digital quadrature signal are converted into the first digital signal and the second digital signal.

When the ONU performs non-orthogonalization on the analog in-phase signal and the analog quadrature signal by using CAP demodulation to convert the analog in-phase signal and the analog quadrature signal into the first analog signal and the second analog signal, or converts the digital in-phase signal and the digital quadrature signal into the first digital signal and the second digital signal by using CAP demodulation, optionally, filtering processing may be separately performed on the analog in-phase signal and the analog quadrature signal for non-orthogonalization, and the analog in-phase signal and the analog quadrature signal are converted into the first analog signal and the second analog signal, or filtering processing may be separately performed on the digital in-phase signal and the digital quadrature signal for non-orthogonalization, and the digital in-phase signal and the digital quadrature signal are converted into the first digital signal and the second digital signal.

For example, if a digital in-phase signal needs to be obtained by decoding an electrical signal $R=(I \times c1)+(Q \times c2)$, R is multiplied by $c1$, and if a digital quadrature signal needs to be obtained, R is multiplied by $c2$.

In this embodiment of the present invention, there are multiple manners for the ONU to convert the first digital signal and the second digital signal. Optionally, the ONU converts the first digital signal and the second digital signal into the one digital signal by using a QAM demodulation scheme, or may convert the first digital signal and the second digital signal into the one digital signal by using a PAM demodulation scheme.

When the ONU converts the first digital signal and the second digital signal into the digital signal by using the QAM demodulation scheme, the first digital signal and the second digital signal are first converted into multiple high-rate parallel digital signals by using the serial/parallel conversion module, a time domain waveform is converted into frequency domain data through FFT (fast Fourier transformation), QAM demodulation is performed on each digital signal to increase a rate, and finally, the multiple high-rate parallel digital signals are multiplexed into one high-rate digital signal, that is, converting the first digital signal and the second digital signal into the one digital signal is completed.

In this embodiment of the present invention, when the ONU converts the analog in-phase signal and the analog quadrature signal into the first analog signal and the second analog signal by using a CDM demodulation scheme, or converts the digital in-phase signal and the digital quadrature signal into the first digital signal and the second digital signal by using a CDM demodulation scheme, in a subsequent process, the ONU converts the received first digital signal and second digital signal into at least one digital signal by using a QAM demodulation scheme; similarly, when the ONU converts the analog in-phase signal and the analog quadrature signal into the first analog signal and the second analog signal by using a CAP demodulation scheme, or converts the digital in-phase signal and the digital quadrature signal into the first digital signal and the second digital signal by using a CAP demodulation scheme, in a subsequent process, the ONU converts the received first digital signal and second digital signal into one digital signal by using a PAM demodulation scheme.

In this embodiment of the present invention, when the OLT splits the digital signal into the first digital signal and the second digital signal by using a QAM modulation scheme, and performs orthogonalization processing on the first digital signal and the second digital signal, or the first analog signal and the second analog signal by using a CDM modulation scheme, the ONU performs non-orthogonalization on the digital in-phase signal and the digital quadrature signal, or the analog in-phase signal and the analog quadrature signal by using a CDM demodulation scheme, and then combines the first digital signal and the second digital signal into one digital signal by using a QAM demodulation scheme.

Similarly, when the OLT splits the digital signal into the first digital signal and the second digital signal by using a PAM modulation scheme, and performs orthogonalization processing on the first digital signal and the second digital signal, or the first analog signal and the second analog signal by using a CAP modulation scheme, the ONU performs non-orthogonalization on the digital in-phase signal and the digital quadrature signal, or the analog in-phase signal and the analog quadrature signal by using a CAP demodulation scheme, and then converts the first digital signal and the second digital signal into one digital signal by using a PAM demodulation scheme.

In order to better understand this embodiment of the present invention, specific application scenarios are provided below, and a procedure of signal receiving is further described in detail.

Figure 7:
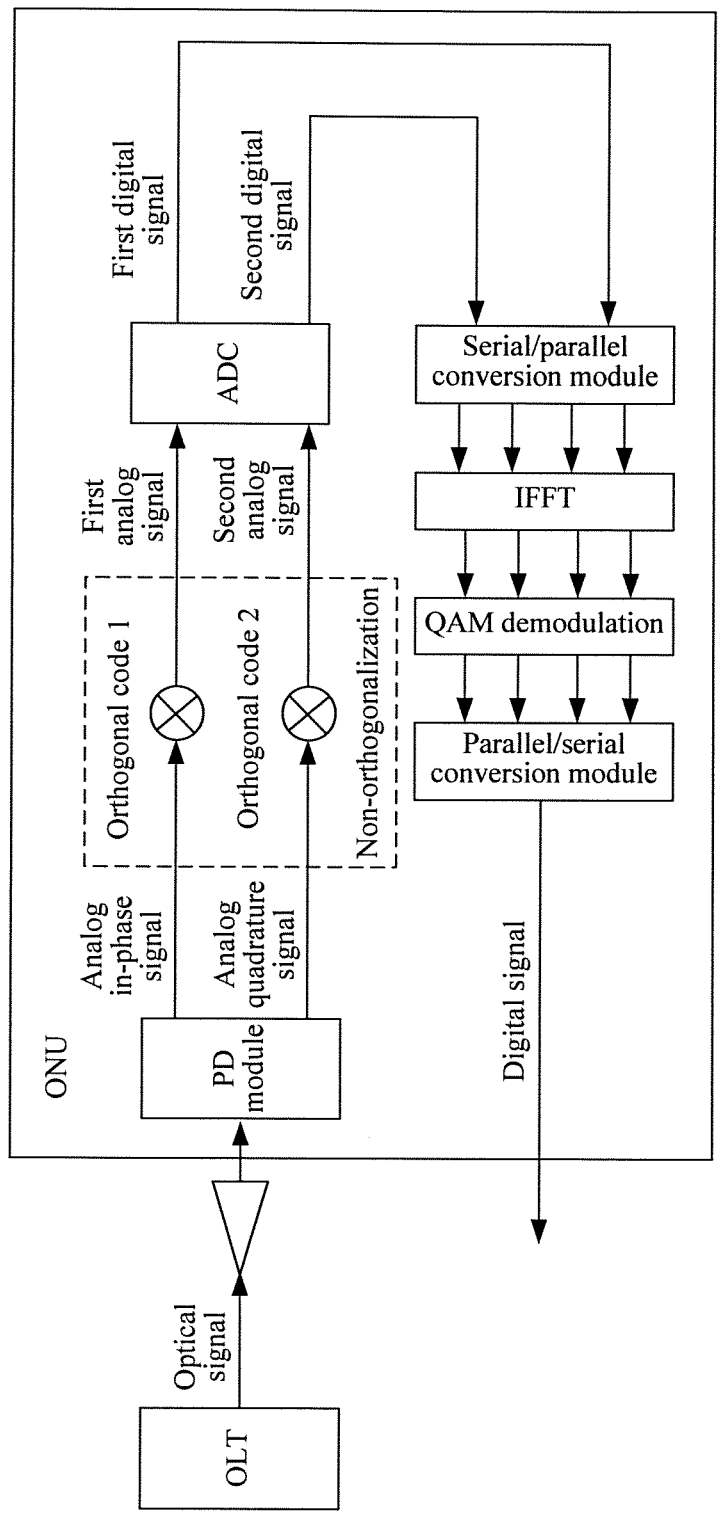
FIG. 7 is a flowchart of an example of a first application scenario of signal receiving according to an embodiment of the present invention.

Embodiment 5 (As Specifically Shown in FIG. 7)

Step 700: An ONU converts, into an electrical signal, a received optical signal sent by an OLT, and splits the obtained electrical signal to obtain an analog in-phase signal and an analog quadrature signal.

The optical signal in this step is combined by respectively loading an analog in-phase signal and an analog quadrature signal to two optical signals that are perpendicular to each other and are in a polarization state.

Step 710: The ONU performs non-orthogonalization on the analog in-phase signal and the analog quadrature signal in a CDM manner, and converts the analog in-phase signal and the analog quadrature signal into a first analog signal and a second analog signal.

In this step, when the ONU performs non-orthogonalization on the analog in-phase signal and the analog quadrature signal in a CDM manner, and converts the analog in-phase signal and the analog quadrature signal into the first analog signal and the second analog signal, optionally, the ONU respectively multiplies the analog in-phase signal and the analog quadrature signal by corresponding orthogonal codes, makes the analog in-phase signal and the analog quadrature signal non-orthogonalized, and converts the analog in-phase signal and the analog quadrature signal into the first analog signal and the second analog signal.

Step 720: The ONU converts the first analog signal and the second analog signal into a first digital signal and a second digital signal by using an ADC.

Step 730: The ONU splits the first digital signal and the second digital signal into four low-rate parallel digital signals by using a serial/parallel conversion module.

Step 740: The ONU performs m-order QAM demodulation on each digital signal to increase a rate again.

Step 750: The ONU performs, by using an FFT module, fast Fourier transformation algorithm processing on each digital signal whose rate is increased again.

Step 760: The ONU multiplexes the four digital signals into one digital signal.

Certainly, the ONU may first convert the obtained analog in-phase signal and analog quadrature signal into the digital in-phase signal and the digital quadrature signal, perform non-orthogonalization on the digital in-phase signal and the digital quadrature signal, and convert the digital in-phase signal and the digital quadrature signal into the first digital signal and the second digital signal, as shown in Embodiment 6.

Figure 8:
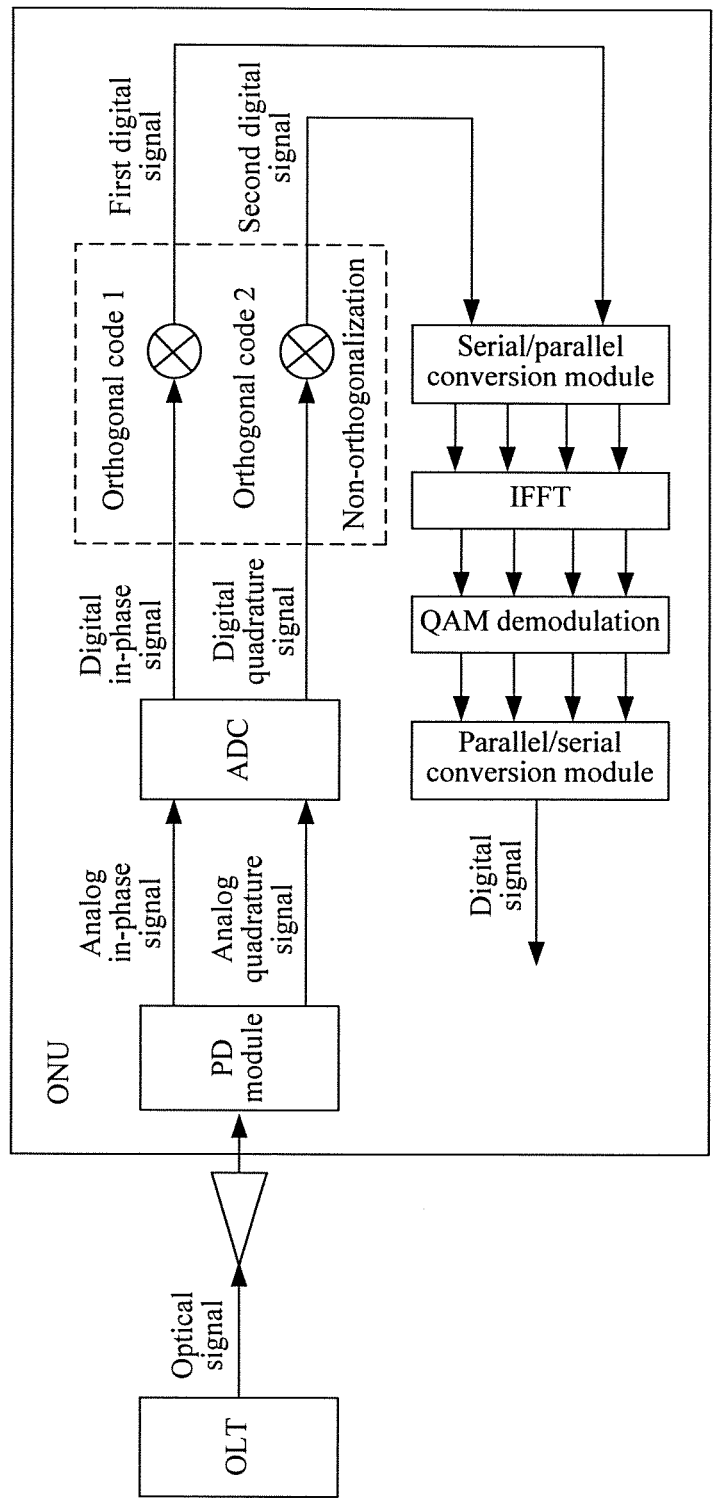
FIG. 8 is a flowchart of an example of a second application scenario of signal receiving according to an embodiment of the present invention.

Embodiment 6 (As Specifically Shown in FIG. 8)

Step 800: An ONU converts, into an electrical signal, a received optical signal sent by an OLT, and splits the obtained electrical signal to obtain an analog in-phase signal and an analog quadrature signal.

The optical signal in this step is combined by respectively loading an analog in-phase signal and an analog quadrature signal to two optical signals that are perpendicular to each other and are in a polarization state.

Step 810: The ONU converts the analog in-phase signal and the analog quadrature signal into a digital in-phase signal and a digital quadrature signal by using an ADC.

Step 820: The ONU performs non-orthogonalization on the digital in-phase signal and the digital quadrature signal in a CDM manner, and converts the digital in-phase signal and the digital quadrature signal into a first digital signal and a second digital signal.

In this step, when the ONU performs the non-orthogonalization on the digital in-phase signal and the digital quadrature signal in a CDM manner, optionally, the ONU respectively multiplies the digital in-phase signal and the digital quadrature signal by corresponding orthogonal codes, makes the digital in-phase signal and the digital quadrature signal non-orthogonalized, and converts the digital in-phase signal and the digital quadrature signal into the first digital signal and the second digital signal.

Step 830: Split the digital in-phase signal and the digital quadrature signal into four low-rate parallel digital signals by using a serial/parallel conversion module.

Step 840: Perform m-order QAM demodulation on each digital signal to increase a rate again.

Step 850: Perform, by using an FFT module, fast Fourier transformation algorithm processing on each digital signal whose rate is increased again.

Step 860: Multiplex the four digital signals into one digital signal.

In this embodiment of the present invention, the ONU may perform orthogonalization on the digital in-phase signal and the digital quadrature signal, or the analog in-phase signal and the analog quadrature signal by using a CAP demodulation scheme, as specifically shown in Embodiment 7.

Figure 9:
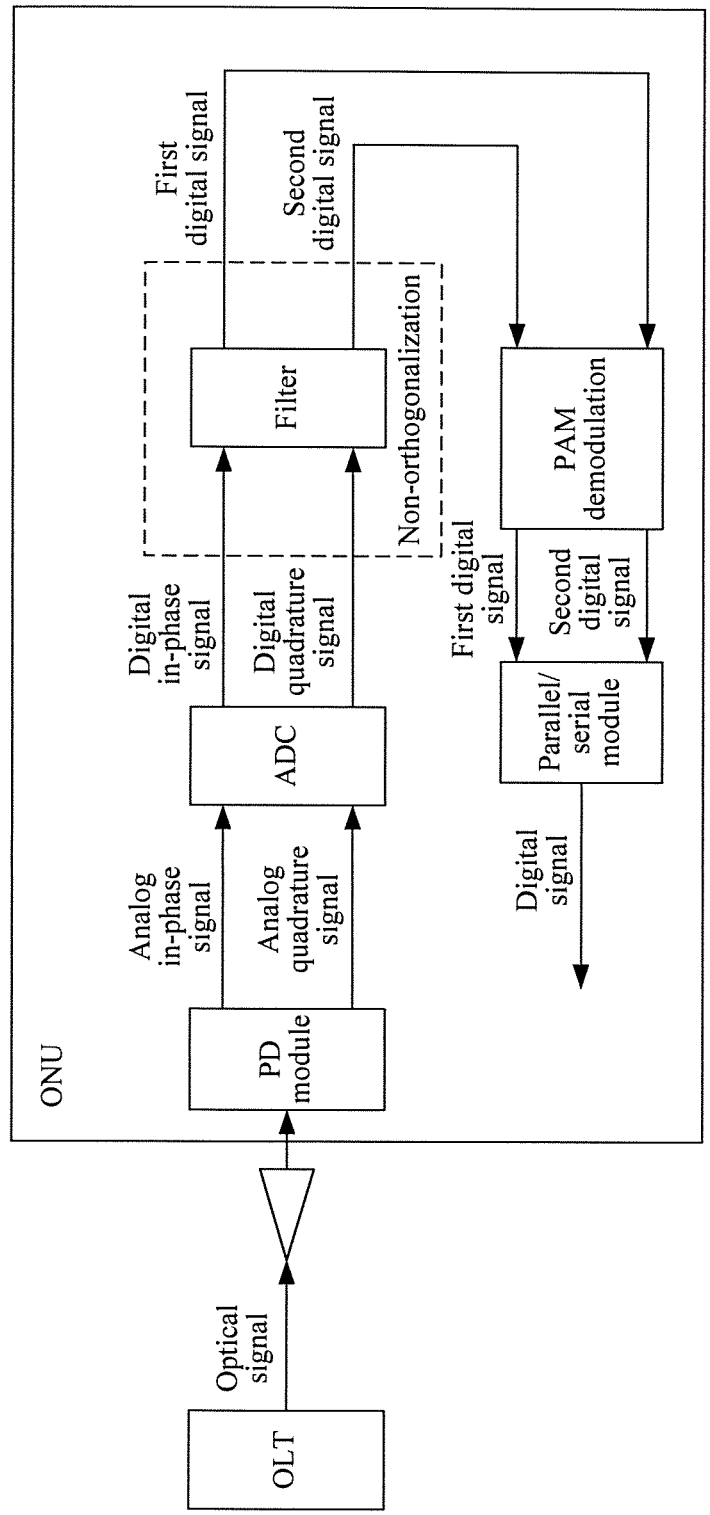
FIG. 9 is a flowchart of an example of a third application scenario of signal receiving according to an embodiment of the present invention.

Embodiment 7 (As Specifically Shown in FIG. 9)

Step 900: An ONU converts, into an electrical signal, a received optical signal sent by an OLT, and splits the obtained electrical signal to obtain an analog in-phase signal and an analog quadrature signal.

The optical signal in this step is combined by respectively loading an analog in-phase signal and an analog quadrature signal to two optical signals that are perpendicular to each other and are in a polarization state.

Step 910: The ONU converts the analog in-phase signal and the analog quadrature signal into a digital in-phase signal and a digital quadrature signal by using an ADC.

Step 920: The ONU performs non-orthogonalization on the digital in-phase signal and the digital quadrature signal in a CAP manner, and converts the digital in-phase signal and the digital quadrature signal into a first digital signal and a second digital signal.

In this step, when the ONU performs non-orthogonalization on the digital in-phase signal and the digital quadrature signal in a CAP manner, optionally, the ONU separately performs filtering processing on the digital in-phase signal and the digital quadrature signal, makes the digital in-phase signal and the digital quadrature signal non-orthogonalized, and converts the digital in-phase signal and the digital quadrature signal into the first digital signal and the second digital signal.

Step 930: Separately perform m-order PAM demodulation on the first digital signal and the second digital signal to increase a rate again.

Step 940: Multiplex the first digital signal and the second digital signal into one digital signal by sing a parallel/serial conversion module.

Figure 10:
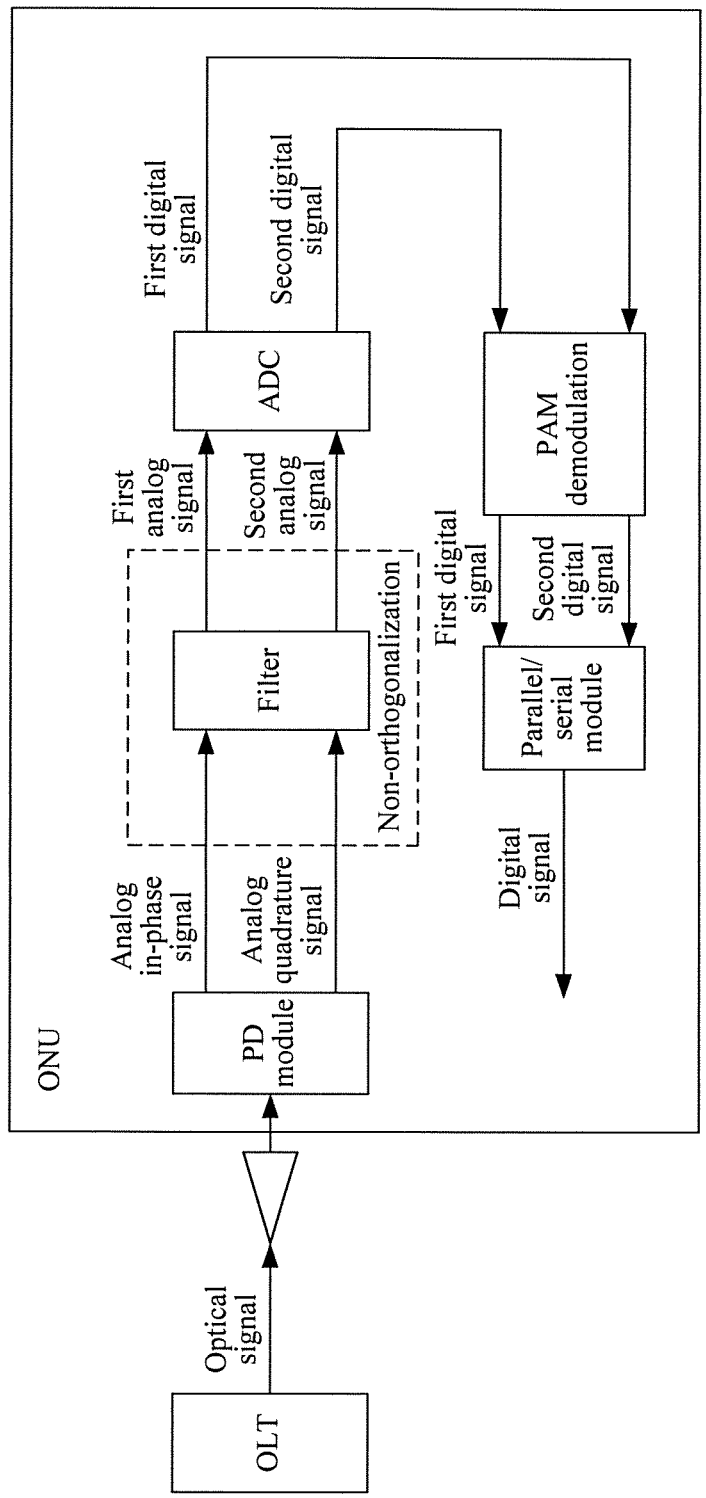
FIG. 10 is a flowchart of an example of a fourth application scenario of signal receiving according to an embodiment of the present invention.

Embodiment 8 (As Specifically Shown in FIG. 10)

Step 1000: An ONU converts, into an electrical signal, a received optical signal sent by an OLT, and splits the obtained electrical signal to obtain an analog in-phase signal and an analog quadrature signal.

The optical signal in this step is combined by respectively loading an analog in-phase signal and an analog quadrature signal to two optical signals that are perpendicular to each other and are in a polarization state.

Step 1010: The ONU performs non-orthogonalization on the analog in-phase signal and the analog quadrature signal in a CAP manner, and converts the analog in-phase signal and the analog quadrature signal into a first analog signal and a second analog signal.

In this step, when the ONU performs non-orthogonalization on the analog in-phase signal and the analog quadrature signal in a CAP manner, optionally, the ONU separately performs filtering processing on the analog in-phase signal and the analog quadrature signal, makes the analog in-phase signal and the analog quadrature signal non-orthogonalized, and converts the analog in-phase signal and the analog quadrature signal into the first analog signal and the second analog signal.

Step 1020: The ONU converts the first analog signal and the second analog signal into a first digital signal and a second digital signal by using an ADC.

Step 1030: The ONU separately performs m-order PAM demodulation on the first digital signal and the second digital signal to increase a rate again.

Step 1040: The ONU multiplexes the first digital signal and the second digital signal into one digital signal by sing a parallel/serial conversion module.

Figure 11:
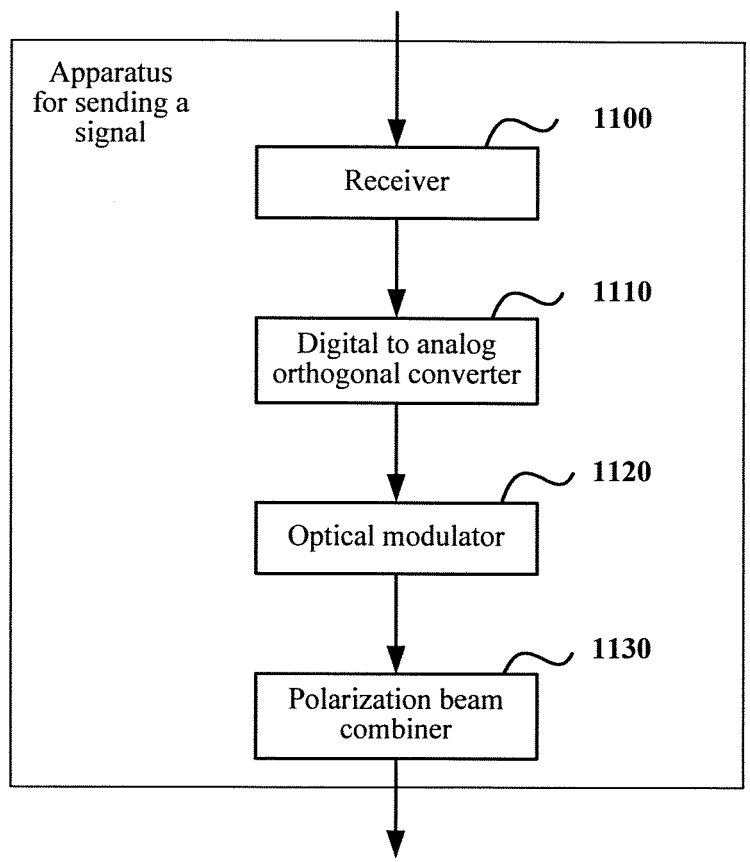
FIG. 11 is a schematic structural diagram of a function of an apparatus for sending a signal according to an embodiment of the present invention.

As shown in FIG. 11, an embodiment of the present invention provides an apparatus for sending a signal, where the apparatus mainly includes:

a receiver 1100, configured to split a received digital signal into a first digital signal and a second digital signal;

a digital to analog orthogonal converter 1110, configured to respectively convert the first digital signal and the second digital signal into an analog in-phase signal and an analog quadrature signal;

an optical modulator 1120, configured to respectively modulate the analog in-phase signal and the analog quadrature signal to two optical signals that are perpendicular to each other and are in a polarization state; and a polarization beam combiner 1130, configured to: after combining the two optical signals that are obtained through modulation, are perpendicular to each other, and are in a polarization state into one optical signal, send the optical signal to an ONU.

Optionally, in this embodiment of the present invention, the receiver 1100 is specifically configured to split the received digital signal into the first digital signal and the second digital signal by using a QAM modulation scheme or a PAM modulation scheme.

Optionally, in this embodiment of the present invention, the digital to analog orthogonal converter 1110 is specifically configured to respectively convert the first digital signal and the second digital signal into a digital in-phase signal and a digital quadrature signal by using a CDM modulation scheme or a CAP modulation scheme, and respectively convert the digital in-phase signal and the digital quadrature signal into the analog in-phase signal and the analog quadrature signal; or respectively convert the first digital signal and the second digital signal into a first analog signal and a second analog signal, and respectively convert the first analog signal and the second analog signal into the analog in-phase signal and the analog quadrature signal by using a code division multiplexing CDM modulation scheme or a carrierless amplitude and phase CAP modulation scheme.

Optionally, in this embodiment of the present invention, the digital to analog orthogonal converter 1110 is specifically configured to multiply the first digital signal by a first codeword, and multiply the second digital signal by a second codeword, to obtain the digital in-phase signal and the digital quadrature signal, where the first codeword and the second codeword are codewords that are mutually orthogonal; or multiply the first analog signal by a first codeword, and multiply the second analog signal by a second codeword, to obtain the digital in-phase signal and the digital quadrature signal, where the first codeword and the second codeword are codewords that are mutually orthogonal.

Optionally, in this embodiment of the present invention, the digital to analog orthogonal converter 1110 is specifically configured to separately process the first digital signal and the second digital signal by using filters whose impulse responses are orthogonal, to respectively convert the first digital signal and the second digital signal into the digital in-phase signal and the digital quadrature signal; or, separately process the first analog signal and the second analog signal by using filters whose impulse responses are orthogonal, to respectively convert the first analog signal and the second analog signal into the analog in-phase signal and the analog quadrature signal.

Figure 12:
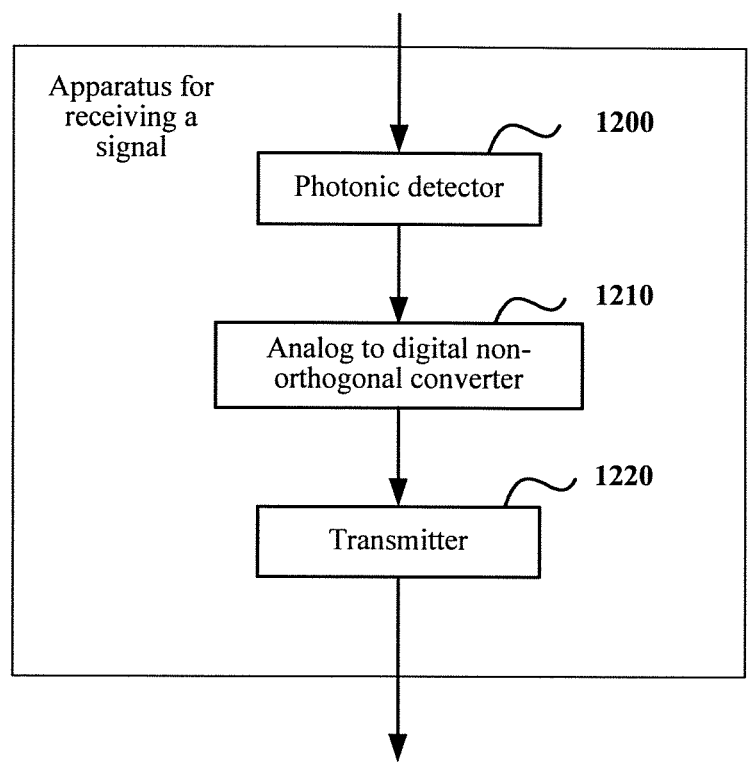
FIG. 12 is a schematic structural diagram of a function of an apparatus for receiving a signal according to an embodiment of the present invention.

As shown in FIG. 12, an embodiment of the present invention provides an apparatus for receiving a signal, where the apparatus mainly includes:

a photonic detector 1200, configured to receive an optical signal sent by an OLT, convert the received optical signal into an electrical signal, and split the electrical signal into an analog in-phase signal and an analog quadrature signal;

an analog to digital non-orthogonal converter 1210, configured to respectively convert the analog in-phase signal and the analog quadrature signal into a first digital signal and a second digital signal; and a transmitter 1220, configured to: after combining the first digital signal and the second digital signal into one digital signal, send the digital signal to a user terminal.

Optionally, in this embodiment of the present invention, the analog to digital non-orthogonal converter 1210 is specifically configured to respectively convert the analog in-phase signal and the analog quadrature signal into a first analog signal and a second analog signal by using a CDM demodulation scheme or a CAP demodulation scheme, and respectively convert the first analog signal and the second analog signal into the first digital signal and the second digital signal by using an analog to digital converter; or, respectively convert the analog in-phase signal and the analog quadrature signal into a digital in-phase signal and a digital quadrature signal by using an analog to digital converter, and convert the digital in-phase signal and the digital quadrature signal into the first digital signal and the second digital signal by using a CDM demodulation scheme or a CAP demodulation scheme.

Optionally, in this embodiment of the present invention, the analog in-phase signal is multiplied by a first codeword, and the analog quadrature signal is multiplied by a second codeword, to respectively obtain the first analog signal and the second analog signal, where the first codeword is a codeword included in the analog in-phase signal, and the second codeword is a codeword included in the analog quadrature signal; or, the digital in-phase signal is multiplied by a first codeword, and the digital quadrature signal is multiplied by a second codeword, to obtain the first digital signal and the second digital signal, where the first codeword is a codeword included in the digital in-phase signal, and the second codeword is a codeword included in the digital quadrature signal.

Optionally, in this embodiment of the present invention, the analog in-phase signal and the analog quadrature signal are separately processed by using filters whose impulse responses are orthogonal, to be converted into the first analog signal and the second analog signal; or, the digital in-phase signal and the digital quadrature signal are separately processed by using filters whose impulse responses are orthogonal, to be converted into the first digital signal and the second digital signal.

Optionally, in this embodiment of the present invention, the transmitter 1220 is specifically configured to combine the digital in-phase signal and the digital quadrature signal into one digital signal by using a QAM demodulation scheme or a PAM demodulation scheme.

Figure 13:
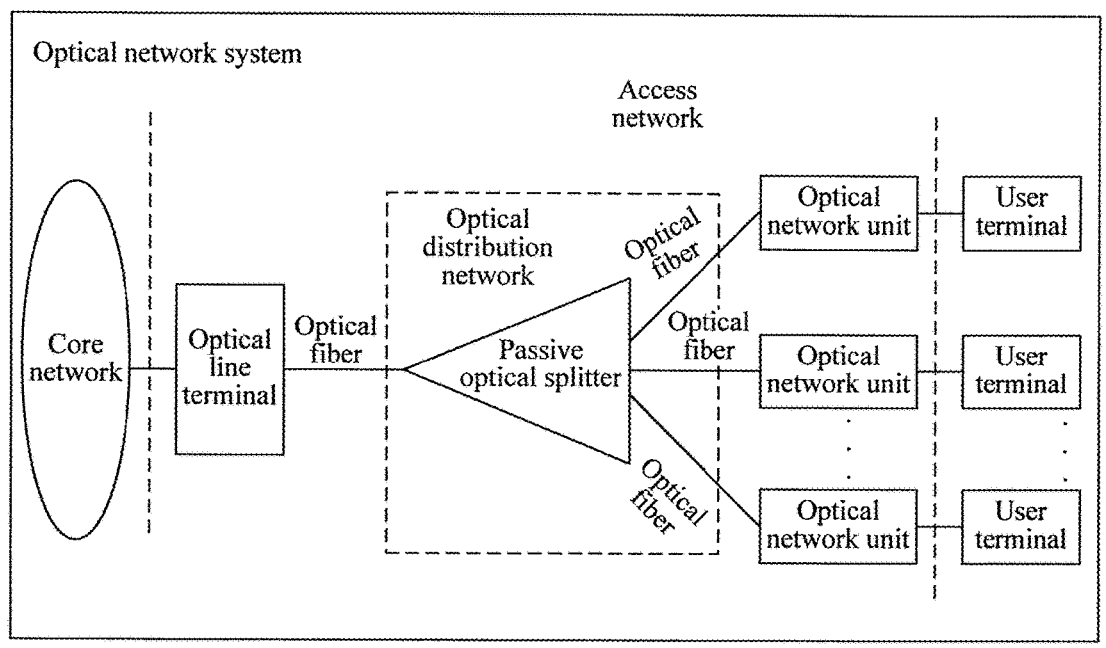
FIG. 13 is a schematic structural diagram of a function of a PON system according to an embodiment of the present invention.

As shown in FIG. 13, an embodiment of the present invention provides a PON system, where the system mainly includes: an OLT 1300, an ONU 1310, and a splitter (passive optical splitter) 1320.

The OLT 1300 may be the apparatus shown in FIG. 11, and may include:

a receiver, configured to split a received digital signal into a first digital signal and a second digital signal;

a digital to analog orthogonal converter, configured to respectively convert the first digital signal and the second digital signal into an analog in-phase signal and an analog quadrature signal;

an optical modulator, configured to respectively modulate the analog in-phase signal and the analog quadrature signal to two optical signals that are perpendicular to each other and are in a polarization state; and a polarization beam combiner, configured to: after combining the two optical signals that are obtained through modulation, are perpendicular to each other, and are in a polarization state into one optical signal, send the optical signal to the optical network unit ONU.

The ONU 1310 may be the apparatus shown in FIG. 12, and may include:

a photonic detector, configured to receive an optical signal sent by the optical line terminal OLT, convert the received optical signal into an electrical signal, and split the electrical signal into an analog in-phase signal and an analog quadrature signal;

an analog to digital non-orthogonal converter, configured to respectively convert the analog in-phase signal and the analog quadrature signal into a first digital signal and a second digital signal; and a transmitter, configured to: after combining the first digital signal and the second digital signal into one digital signal, send the digital signal to a user terminal.

In this embodiment of the present invention, the OLT 1300 and the ONU 1310 that are included in the PON system also have other functions. For details, reference may be specifically made to all the functions of the apparatus shown in FIG. 11 and all the functions of the apparatus shown in FIG. 12, and details are not provided herein again.

In this embodiment of the present invention, all Splitters and all optical fibers that are in the PON system form an ODN (Optical Distribution Network, optical distribution network). In a transmission process, the PON system transmits, in one optical fiber by using a single-fiber bidirectional transmission mechanism, two waves which have opposite directions and different wavelengths, where each wave carries a digital signal in one direction.

To sum up, in the embodiments of the present invention, methods for sending and receiving a signal are put forward. When a signal is sent, a digital signal is received, the digital signal is split into a first digital signal and a second digital signal, the first digital signal and the second digital signal are respectively converted into an analog in-phase signal and an analog quadrature signal, the analog in-phase signal and the analog quadrature signal are respectively modulated to two optical signals that are perpendicular to each other and are in a polarization state, and after the two optical signals that are perpendicular to each other and are in a polarization state are combined into one optical signal, the optical signal is sent to an ONU; when a signal is received, a received optical signal sent by an OLT is converted into an electrical signal, the electrical signal is split into an analog in-phase signal and an analog quadrature signal, an ONU splits the analog in-phase signal and the analog quadrature signal into a digital in-phase signal and a digital quadrature signal, and after combining the digital in-phase signal and the digital quadrature signal into one digital signal, sending the digital signal to a user terminal. In this way, in a signal transmission process, there is no need to use an up-conversion processing technology, and a received optical signal does not distort. Therefore, quality of a transmitted digital signal is improved. In addition, there is no need to use an up-conversion processing device, which further reduces implementation costs.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a function in one or more processes in the flowcharts and/or in one or more blocks in the block diagrams.

Although the foregoing embodiments of the present invention have been described, persons skilled in the art can make changes and modifications to these embodiments once they learn the basic inventive concept. Therefore, the following claims are intended to be construed as to cover the foregoing embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. A method for sending a signal, the method comprising:
    splitting a received digital signal into a first digital signal and a second digital signal;
    respectively converting the first digital signal and the second digital signal into a digital in-phase signal and a digital quadrature signal by using a code division multiplexing (CDM) modulation scheme and respectively converting the digital in-phase signal and the digital quadrature signal into an analog in-phase signal and an analog quadrature signal by using a digital to analog converter;
    respectively modulating the analog in-phase signal and the analog quadrature signal to two optical signals that are perpendicular to each other and are in a polarization state; and
    after the two optical signals that are obtained through modulation, are perpendicular to each other, and are in a polarization state are combined into one optical signal, sending the optical signal to an optical network unit (ONU).

2. The method according to claim 1, wherein, respectively converting the first digital signal and the second digital signal into the digital in-phase signal and the digital quadrature signal by using the CDM modulation scheme, comprises, separately processing the first and second digital signal utilizing orthogonal codes for orthogonalization.

3. The method according to claim 2, wherein, the orthogonal codes include differing codewords.

4. A method for receiving a signal, the method comprising:
    receiving an optical signal sent by an optical line terminal (OLT);
    converting the received optical signal into an electrical signal, and splitting the electrical signal into an analog in-phase signal and an analog quadrature signal;
    respectively converting the analog in-phase signal and the analog quadrature signal into a first analog signal and a second analog signal by using a code division multiplexing (CDM) demodulation scheme and respectively converting the first analog signal and the second analog signal into a first digital signal and a second digital signal by using an analog to digital converter; and
    after the first digital signal and the second digital signal are combined into one digital signal, sending the digital signal to a user terminal.

5. The method according to claim 4, wherein, respectively converting the analog in-phase signal and the analog quadrature signal into the first analog signal and the second analog signal by using the CDM demodulation scheme, comprises, separately processing the analog in-phase signal and the analog quadrature signal utilizing orthogonal codes for orthogonalization.

6. The method according to claim 5, wherein, the orthogonal codes include differing codewords.

7. An apparatus for sending a signal, the apparatus comprising:
    a receiver, configured to split a received digital signal into a first digital signal and a second digital signal;
    a digital to analog orthogonal converter, configured to respectively convert the first digital signal and the second digital signal into a digital in-phase signal and a digital quadrature signal by using a code division multiplexing (CDM) modulation scheme and respectively convert the digital in-phase signal and the digital quadrature signal into an analog in-phase signal and an analog quadrature signal;
    an optical modulator, configured to respectively modulate the analog in-phase signal and the analog quadrature signal to two optical signals that are perpendicular to each other and are in a polarization state; and a polarization beam combiner, configured to: after combining the two optical signals that are obtained through modulation, are perpendicular to each other, and are in a polarization state into one optical signal, send the optical signal to an optical network unit (ONU).

8. The apparatus according to claim 7, wherein, respectively converting the first digital signal and the second digital signal into the digital in-phase signal and the digital quadrature signal by using the CDM modulation scheme, comprises, separately processing the first and second digital signal utilizing orthogonal codes for orthogonalization.

9. The apparatus according to claim 8, wherein, the orthogonal codes include differing codewords.

10. An apparatus for receiving a signal, the apparatus comprising:

a photonic detector, configured to receive an optical signal sent by an optical line terminal (OLT), convert the received optical signal into an electrical signal, and split the electrical signal into an analog in-phase signal and an analog quadrature signal;

an analog to digital non-orthogonal converter, configured to respectively convert the analog in-phase signal and the analog quadrature signal into a first analog signal and a second analog signal by using a code division multiplexing (CDM) demodulation scheme and respectively convert the first analog signal and the second analog signal into a first digital signal and a second digital signal by using an analog to digital converter; and a transmitter, configured to: after combining the first digital signal and the second digital signal into one digital signal, send the digital signal to a user terminal.

11. The apparatus according to claim 10, wherein, respectively converting the first digital signal and the second digital signal into the digital in-phase signal and the digital quadrature signal by using the CDM demodulation scheme, comprises, separately processing the first and second digital signal utilizing orthogonal codes for orthogonalization.

12. The apparatus according to claim 11, wherein, the orthogonal codes include differing codewords.

* * * * *